(12) United States Patent
Willenegger et al.

(10) Patent No.: US 6,788,937 B1
(45) Date of Patent: Sep. 7, 2004

(54) RESERVATION MULTIPLE ACCESS

(75) Inventors: Serge Willenegger, Onnens (CH); Vieri Vanghi, Del Mar, CA (US); Rod J. Walton, Westford, MA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

(21) Appl. No.: 09/275,729

(22) Filed: Mar. 24, 1999

Related U.S. Application Data

(63) Continuation-in-part of application No. 09/173,572, filed on Oct. 15, 1998, now Pat. No. 6,256,301.

(51) Int. Cl.[7] .............................. H04Q 7/20; H04Q 7/00; H04B 7/216
(52) U.S. Cl. ....................... 455/434; 455/509; 455/515; 455/517; 370/329; 370/335; 370/342
(58) Field of Search .............................. 370/328, 329, 370/335, 342, 343, 348, 318, 320, 322, 462, 445, 447, 461, 443, 444, 437; 455/434, 435.2, 450, 455, 515–517

(56) References Cited

U.S. PATENT DOCUMENTS

| | | | |
|---|---|---|---|
| 5,278,833 A | | 1/1994 | Crisler et al. |
| 5,502,722 A | | 3/1996 | Fulghum |
| 5,544,196 A | * | 8/1996 | Tiedemann, Jr. et al. ... 375/200 |
| 5,604,730 A | | 2/1997 | Tiedemann, Jr. |
| 5,673,259 A | * | 9/1997 | Quick, Jr. .................... 370/342 |
| 5,809,422 A | | 9/1998 | Raleigh et al. |
| 5,828,662 A | | 10/1998 | Jalali et al. |
| 6,002,664 A | * | 12/1999 | Schachter .................... 370/207 |
| 6,219,341 B1 | * | 4/2001 | Varanasi ...................... 370/252 |
| 6,252,865 B1 | * | 6/2001 | Walton et al. ............... 370/335 |
| 6,256,301 B1 | * | 7/2001 | Tiedemann, Jr. et al. ... 370/342 |
| 6,366,779 B1 | * | 4/2002 | Bender et al. ............... 455/450 |
| 6,498,785 B1 | * | 12/2002 | Derryberry et al. .......... 370/311 |
| 6,519,233 B1 | * | 2/2003 | Gutierrez ..................... 370/320 |

FOREIGN PATENT DOCUMENTS

| | | |
|---|---|---|
| EP | 0765096 | 3/1997 |
| EP | 1001572 | 5/2000 |
| WO | 9818280 | 4/1998 |
| WO | 0022873 | 4/2000 |

OTHER PUBLICATIONS

Multi–access Protocols in Packet Communication Systems—Fouad Tobagi, IEEE Trans. on Comm, vol. com–28, No.4,Apr. 1980.

Packet Switching In Radio Channels: Part 1–Carrier Sense Multiple Access Modes and their throughput–delay characteristics—L. Kleinrock and F. Tobagi, IEEE Trans. on Comm, vol. com–23,No.12,Dec. 1975.

Packet Switching In Radio Channels: Part 1–The Hidden Terminal Problem in Carrier Sense Multiple Access and the Busy–tone Solution—L. Kleinrock and F. Tobagi, IEEE Trans. on Comm, vol. com–23,No.12,Dec. 1975.

* cited by examiner

*Primary Examiner*—William Trost
*Assistant Examiner*—Meless Zewdu
(74) *Attorney, Agent, or Firm*—Philip R. Wadsworth; Thien T. Nguyen; S. Hossain Beladi

(57) ABSTRACT

A mobile station accesses a base station by randomly selecting a first reverse link common control channel from a set of random access channels. The mobile station transmits a request portion of an access probe over the first reverse link common control channel. The request portion is subject to collision with other signals. The request portion comprises a hash identification which is derived from a uniquely identifying number using a hash function. The hash identification quasi-uniquely identifies the mobile station. The mobile station receives a channel assignment message from the base station designating the hash identification and a reserved access channel. The reserved access channel provides communication with a low probability of contention. The mobile station transmits a message portion of the access probe over the reserved access channel.

26 Claims, 8 Drawing Sheets

RESERVATION MULTIPLE ACCESS

RELATED APPLICATIONS

This patent application is a continuation part of and claims priority under 35 U.S.C. 120 to U.S. patent application entitled, "Reservation Multiple Access", Ser. No.: 09/173,572, which was filed on Oct. 15, 1998 now U.S. Pat. No. 6,256,301.

BACKGROUND OF THE INVENTION

I. Field of the Invention

The invention relates generally to wireless communications. More particularly, the invention relates to multiple access in a wireless communication system.

II. Description of the Related Art

In a typical wireless communication system, a plurality of mobile stations communicate through a common base station. Because the base station has finite resources available, the mobile stations compete for access to the base station resources. FIG. 1 is a block diagram showing a typical modern wireless communication system 10. The system is comprised of a series of base stations 14. A set of mobile stations 12 communicate with the base stations 14. The mobile stations 12 communicate with the base stations 14 over a forward link channel 18 and a reverse link channel 20. As used herein, the term "channel" refers to both a single communication link between the base station and a specific mobile station as well as a grouping of communication links, typically having a common function. FIG. 1 shows a variety of types of mobile stations. For example, FIG. 1 shows a hand-held portable telephone, a vehicle mounted mobile telephone and a fixed location wireless local loop telephone. Such systems offer voice and data services. Other modem communication systems operate over wireless satellite links rather then through terrestrial base stations.

An industry standard for a wireless system using code division multiple access (CDMA) is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here in as IS-95), the contents of which are also incorporated herein by reference. Among other channels, IS-95 defines a reverse link random access channel which is used by the mobile stations to communicate with a base station. The access channel is used for short signaling message exchanges such as call originations, responses to pages and registrations. For example, for prolonged bi-directional communications, a dedicated forward link and reverse link traffic channel pair are established between the mobile station and the base station. The access channel can be used to transfer information from the mobile station to the base station before the traffic channel is established in order to facilitate establishment.

The access channel defined by IS-95 is a random access channel meaning that a mobile station randomly chooses a portion of the access channel resources over which to transmit an access probe. Due to the random nature of the access channel, there is no guarantee that only a single mobile station will attempt access on the chosen portion. Therefore, when an access probe is sent, it may fail to be received by the base station for one of several reasons. It may fail because the power level received at the base station is too low compared to the current interference levels. It may fail because another mobile station attempts to use the same portion of the access channel resources at the same time causing a collision. In any case, when the access probe is not received at the base station, the mobile station randomly selects another portion of the access channel resources and attempts access to the system, perhaps using a higher signal level. In order to avoid a series of lockstep failures between two mobile station after an initial collision, the retransmission process is also randomized.

In order to select a portion of the access channel resources, according to IS-95, the mobile station randomly selects one of a set of one or more access channels defined by CDMA techniques. Once an access channel is selected, the mobile station is constrained to begin transmission of the access probe at one of a set of re-occurring slot boundaries. The mobile station randomly selects a slot boundary and begins transmission. Such operation is referred to as slotted aloha operation and is well known in the art.

One key aspect of a random access system is load control. Load control is used to statistically control the rate at which access probes are received at the base station. Load control in a slotted aloha system is important because as the number of access attempts increases, the number of collisions also increases. As the loading further increases, the number of successful access attempts actually begins to fall due to the system resources being consumed with collisions. Therefore, in a slotted aloha system, it is advantageous to keep system loading at less than 18% of the fully loaded capacity, otherwise unstable behavior can result.

Loading is also a function of the amount of interference in the system. The available capacity of a system decreases as the interference increases. As the load on the random access channel increases, it may cause significant interference to other channels in the system such as the traffic channels. According to IS-95, loading on the access channel is controlled by the insertion of random delay (called access probe back-off) between a failed access attempt and a follow up attempt. However, IS-95 lacks any mechanism for quickly enabling and disabling access to the access channel in order to control loading.

According to IS-95, when a mobile station sends an access probe, it transmits a uniquely identifying number such as the electronic serial number (ESN) of the mobile station along with other information in a preamble. In addition, the access probe comprises a message which specifies the purpose of the probe or carries user data. For example, the message may designate a telephone number for use in a call origination. An access probe is typically between 80 and 150 milliseconds (msec) in duration.

According to IS-95, the mobile station initially transmits the access probe at a first level. If the base station does not respond with an acknowledgment after a predetermined amount of time, the mobile station continues to repeat the access probe at increasingly higher power levels.

This method of access does not yield a very efficient use of system resources. First, the access probe is fairly lengthy and the mobile station continues to transmit the entire access probe even if the base station is unable to receive the access probe, thus, spewing un-useful energy into the system, wastefully expending mobile station resources and reducing system capacity. According to IS-95, once the mobile station has begun to transmit, no power control mechanism exists by which the base station can increase or decrease the transmit power. If the reverse link is subjected to a deep fade, the transmission may fail and the mobile station retransmits the message at a higher power level which may not be necessary in the absence of the fade. The base station has no means to request more power during the deep fade nor to request a reduction in power during the subsequent retransmission. In addition to consuming significant system resources, the access method according to IS-95 can stretch to cover a significant amount of time adding delay to the system. According to IS-95, data is transmitted over the access channel at only one data rate regardless of the amount of data or the quality of the connection between the mobile station and the base station.

Thus, there has been a need in the art to develop a multiple access system which introduces less delay and makes more efficient use of the available system resources.

SUMMARY OF THE INVENTION

Reservation multiple access (RsMA) is used to provide multiple access to a plurality of mobile stations. The access probes used to access the system are divided into two different portions: a request portion and a message portion. The request portion comprises a number which "quasi-uniquely" identifies the mobile station. For example, a hash identification can be derived from a longer number which uniquely identifies the mobile station using a hash function. The request portion also comprises a preamble to facilitate detection. The length of the request portion is small in comparison to the length of the message portion.

The request portion is sent over a random access channel. For example, in one embodiment, the request portion is transmitted over slotted aloha channel in which the slot boundaries follow closely after one another such as on the order of the length of several request portions.

If the request portion is properly detected by the base station and if resources are available, the base station assigns a reserved access channel using a channel assignment message. The channel assignment message comprises the hash identification. The mobile station sends the message portion over the reserved access channel. The reserved access channel provides communication with a low probability of contention. In one embodiment, the message portion can comprise a request for a traffic channel or other system administration message or it may contain a datagram of user information. In one embodiment, the message portion can take on one of a set of variable data rates.

In another embodiment, a forward link channel sends power control information to the mobile station while it is transmitting over the reserved access channel. In yet another embodiment, the channel assignment messages, the power control information, or both, are sent from a plurality of sectors, base stations or both.

In one embodiment, a base station send can send a wait message to a specific mobile station or to a class of mobile stations over the forward link channel assignment channel which also carries the channel assignment messages. The wait message delays subsequent access attempts by the subject mobile stations. In another embodiment, a wait message can be used to quickly disable access to the system in order to control loading.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE INVENTION

In order to overcome the limitations of the prior art, the invention uses a reservation multiple access (RsMA) format to facilitate random access to the system. In order to increase efficiencies, the access message is divided into two different portions: a request portion and a message portion. The request portion is sent over a random access channel. In response, a reserved access channel is assigned. The message portion is sent over the reserved access channel. Through the use of a reserved access channel, in one embodiment, closed loop power control is applied to the message portion of the access probe. Together with other features, the invention lends efficiencies to the access process.

Figure 1:
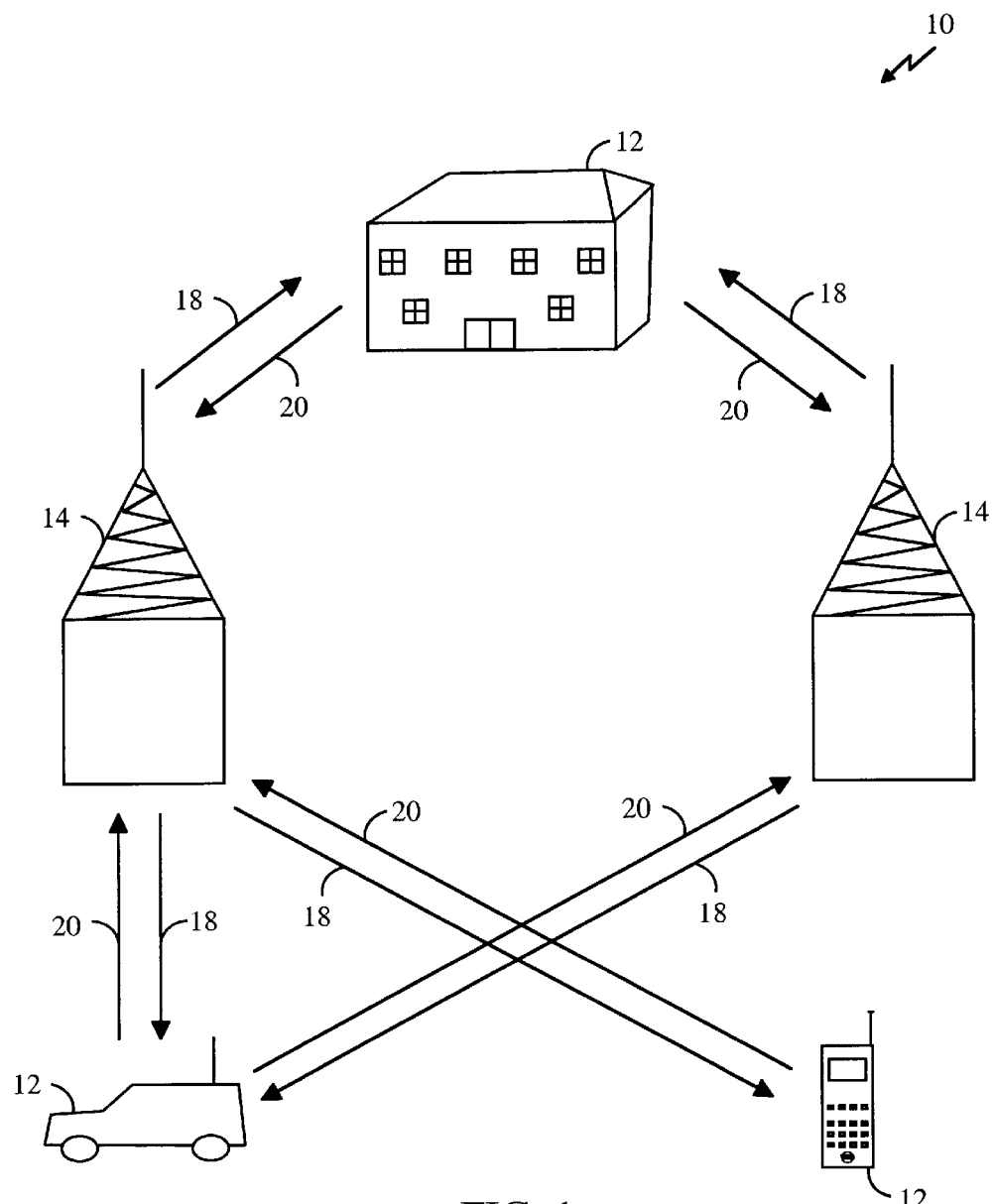
FIG. 1 is a block diagram showing a typical modern wireless communication system.
Figure 2A:
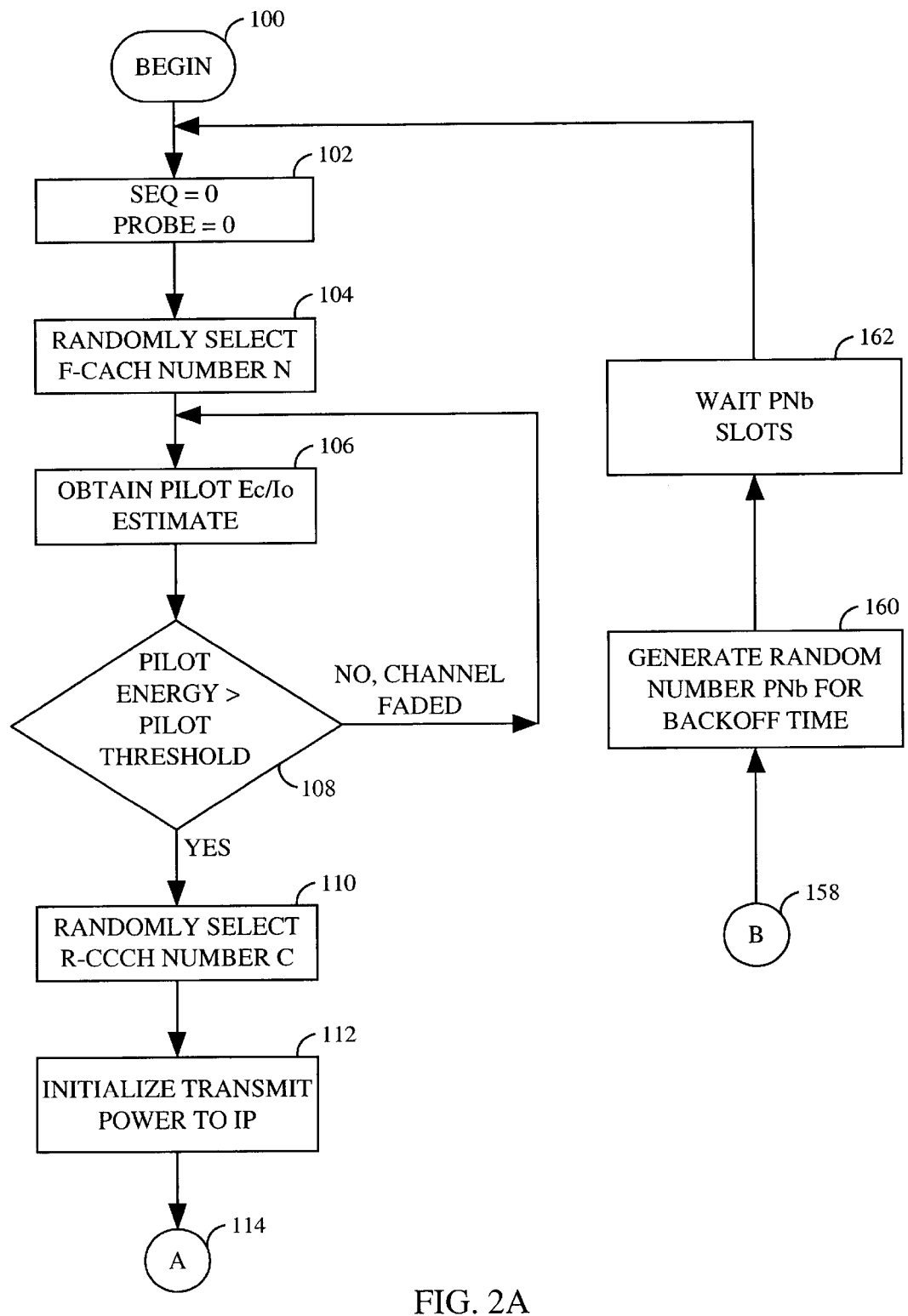
FIGS. 2A and 2B are flow charts showing mobile station operation in RsMA.
Figure 2B:
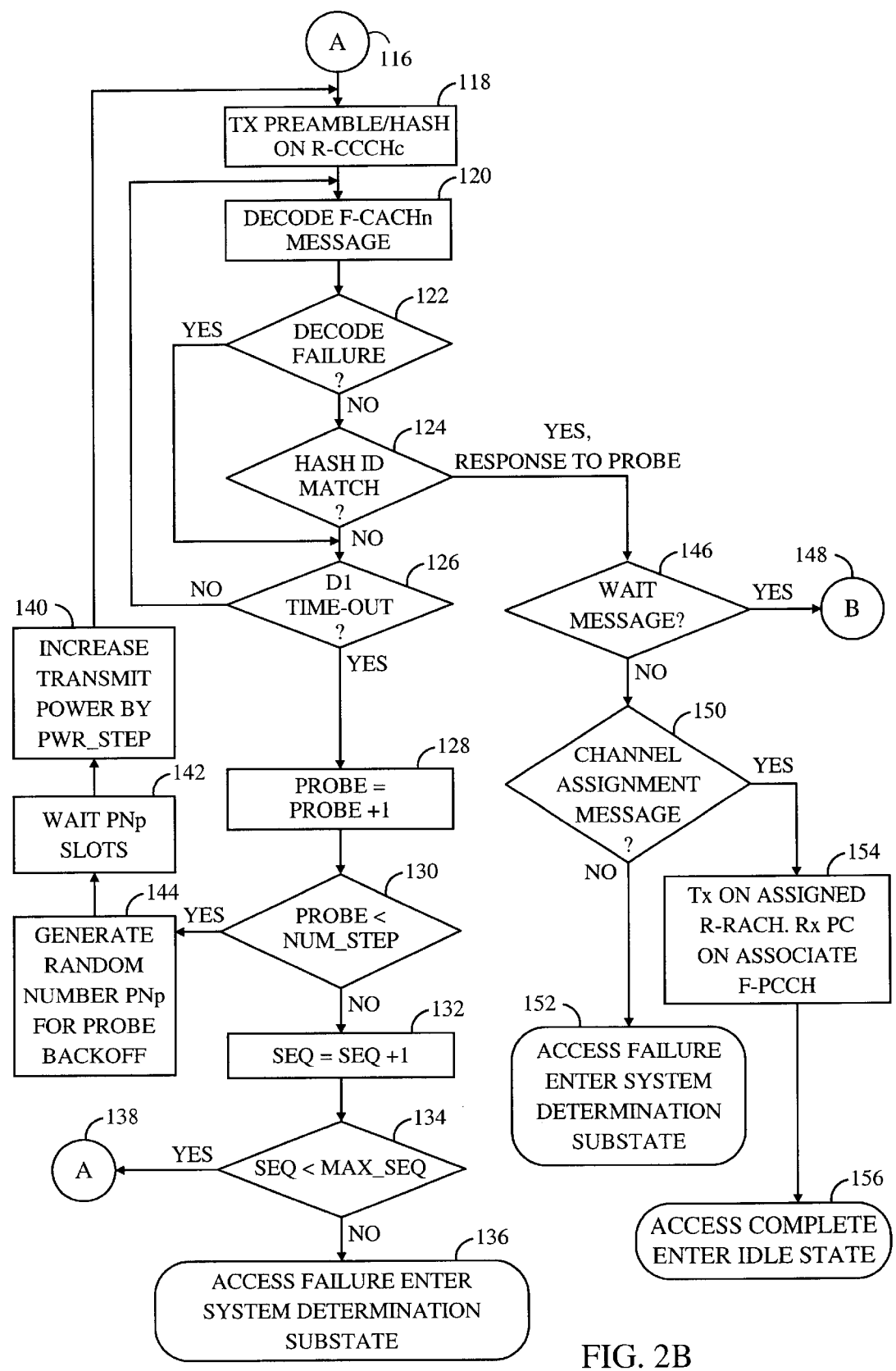
Figure 3:
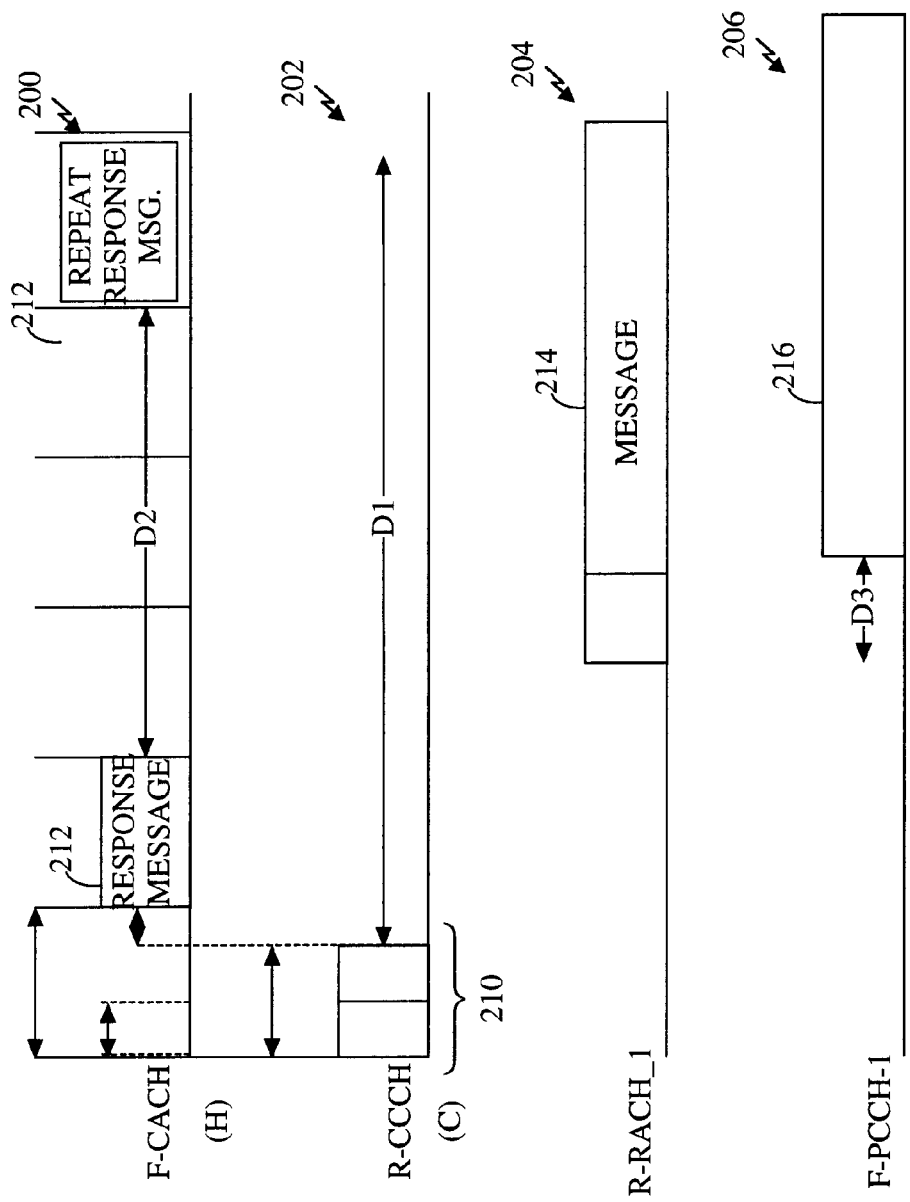
FIG. 3 is a representational diagram showing a series of channels in a RsMA system.

The invention is best understood by way of example. FIGS. 2A and 2B are flow charts exemplifying mobile station operation in a RsMA system according to the invention. FIG. 3 is a representational diagram showing a series of channels and messages in a RsMA system which can be used to facilitate an understanding of FIG. 2.

Referring to FIG. 2A, flow begins in start block 100. In block 102, the sequence number and probe number are set to 0. In block 104, the mobile station randomly selects a forward link channel assignment channel (F-CACH) from a set of forward link channel assignment channels supported by the system. For example, the mobile station selects the n-th forward link channel assignment channel such as F-CACH(n) 200 shown in FIG. 3. In one embodiment, the number of forward link channel assignment channels is programmable and can be reduced to 1 or even 0 in order to reduce the number of successful accesses.

In block 106, the mobile station estimates the signal quality of the pilot signal received from the corresponding base station. For example, the mobile station may estimate the ratio of the energy in the carrier to the noise power density ($E_c/I_o$) at which the pilot signal is received. Block 108 determines whether the pilot signal quality exceeds a predetermined threshold. If not, the mobile station assumes that the forward link channel has faded and flow continues back to block 106 until the signal quality improves. Due to the rapid fading nature of the terrestrial channel, adverse fading conditions typically correct themselves quite rapidly. By avoiding transmission during a deep fade, the mobile station can increase the likelihood that it will receive a base station response on the F-CACH as described in more detailed below. Blocks 106 and 108 are optional and some embodiments may not contain this feature.

If it is determined in block 108 that the signal quality of the pilot signal exceeds the threshold, flow moves to block 110 wherein the mobile station randomly selects a reverse link common control channel (R-CCCH) corresponding to the selected R-CCCH. For example, the mobile station selects the c-th reverse link common control channel, such as R-CCCH(c) 202 shown in FIG. 3. In one embodiment, the F-CACH is associated with a plurality of R-CCCH. In block 112, the mobile station initializes the transmit power to an initial power level (IP). In one embodiment, the value of IP is determined based upon the signal quality of the pilot signal as well as other factors. In another embodiment, the value of IP is a fixed or programmable value. Flow continues through off page connector 114 to off page connect 116 of FIG. 2B.

In block 118, the mobile station transmits a request portion of an access probe comprising a preamble and hash ID over the R-CCCH(c) 202, as shown by the request message 210. The hash ID is derived from information that is unique to the transmitting mobile station. According to one of a plurality of well known techniques, the hash value is generated by a hash function that maps an input number comprising a large number of bits into an output number that is shorter. For example, in one embodiment of the invention, the input information for the hash function comprises the electronic serial number (ESN) of the mobile station which is, according to IS-95, a 32 bit number assigned by the mobile station manufacture which uniquely identifies the mobile station equipment. Using 32 bits, over four billion mobile stations can be assigned a unique ESN. The output of the hash function is, for example, a 12 bit number defining 4096 different "quasi-unique" hash ID values. Although not unique, the length of the hash ID is sufficient to make it extremely unlikely that more than one mobile station operating within the coverage area of a base station will generate the same hash ID and transmit the request portion of an access probe at the same time. The use of this hash ID allows less information to be transmitted compared to IS-95, while still distinguishing that mobile station from all others in the area in the vast majority of cases. If a collision occurs between two or more mobile station using the same hash ID at the same time, some or all of the access attempts may fail. In such a case, the unsuccessful request portion is retransmitted again and the random back-off periods reduces the risk of a subsequent collision.

Eventually, during the course of the access, the mobile station must be uniquely identified to the base station. However, such unique identification is not necessary in order to proceed with system access at this point. The use of a hash ID significantly reduces the amount of data which is transmitted in the request portion of the access probe. According to the invention, unique identification of the mobile station is accomplished within the message portion of the access probe rather than in the request portion.

In block 120, the mobile station monitors the F-CACH(n) 200 to determine whether the access probe is successfully decoded by the base station. For example, in FIG. 3, in one scenario, the base station responds by transmission of a responsive message 212. The responsive message comprises the hash ID of the mobile station to which it is directed. The responsive message also comprises a cyclic redundancy check (CRC) value or other error detection mechanism. In one embodiment, the F-CACH(n) 200 is associated with a number of R-CCCH(c) and can carry messages intended for a number of different mobile stations, each of which includes a CRC value. In block 122, the mobile station monitors responsive messages carried on the F-CACH(n) and determines whether a failure is detected by reliance on the CRC. If a failure is detected, flow continues in block 126 as explained below. In one embodiment, the base station retransmits a repeat responsive message 212' if no response from the mobile station is detected. In FIG. 3, the response message is repeated D2 seconds after the end of the initial transmission such that the mobile station timer D1 does not expire until the end of the repeated response message 212'. In one embodiment, the mobile station soft combines energy from to original response message 212 and the repeat response message 212' to improve performance according to well known techniques.

If no failure is detected in block 122, the process moves to block 124 and determines whether the specified hash ID transmitted in the responsive message 212 carried on the F-CACH(n) 200 matches the hash ID transmitted by the mobile station. If the hash ID does not match or if a failure was decoded in block 122, flow continues to block 126. Block 126 determines whether the D1 timer has expired. The D1 is reset when the request portion of the access probe is transmitted and accumulates time until it has timed out. For example, in FIG. 3, the period of the D1 timer is indicated by the double arrow line labeled D1, beginning from the end of the request portion 210 of the access probe. If the D1 timer has not expired, the mobile station continues to monitor the F-CACH(n) 200 beginning in block 120.

If the hash ID matches, flow continues from block 124 to block 146. Block 146 determines whether the responsive message 212 is a wait message. For example, the base station may send a wait message which directs the mobile station to attempt access again after the passage of some amount of time. In this way, the base station can control the base station loading caused by the mobile stations using these reverse link channels. By setting the wait time to infinity, the system has a mechanism for quickly disabling access to the access channel in order to control loading. If the message is a wait message, flow continues through off page connector 148 to off page connector 158 of FIG. 2A. In block 160, the mobile station generates a pseudo random number PN(b) to be used for a back-off timer. In block 162, the mobile station waits PN(b) slot times before re-entering flow to attempt another access. In one embodiment, the wait message simply directs the mobile station to enter the routine which chooses the back-off period. In another embodiment, the base station can direct the mobile station to wait an additional amount on top of the wait specified by the randomly chosen number. In yet another embodiment, the base station can specify a factor by which the back-off period is multiplied in order to change the wait period.

Returning again to FIG. 2B, if no wait message is received in block 146, flow continues to block 150. Block 150 determines whether a channel assignment message is received. If no channel assignment message is received, flow continues to block 152 where access failure is declared and the mobile station enters a system determination state. In other embodiments, other types of responsive messages are included in the system and are detected before a failure is declared.

If a channel assignment message is detected in block 150, flow continues to block 154. The channel assignment message specifies a reverse link, reserved access channel (R-RACH) for use by the mobile station, such as R-RACH$_{13}$ 1 204 shown in FIG. 3. The reserved channel is not subject to contentions with high probability because the likelihood of two or more mobile stations accessing the system with the same has ID is very small. In addition, in one embodiment, the reserved channel is associated with a forward link power control channel (F-PCCH), such as F-PCCH_1 206 shown in FIG. 3, which provides closed loop power control for the mobile station as explained below. In one embodiment, based upon the assignment of the R-RACH$_{13}$ 1, the mobile station can determine the associated F-PCCH. In another embodiment, the channel assignment message specifies both a R-RACH and a F-PCCH.

In one embodiment, the channel assignment message can specify a wait period. In this embodiment, the base station determines that a certain R-RACH which is currently in use will be available at some time in the future. It may make this determination based upon the known length of a message already in progress or based upon a known maximum length for messages. In essence, the time delayed channel assignment message tells the mobile station to begin transmission on the specified R-RACH after a predetermined number of frames have passed. This type of operation has the advantage of freeing the R-CCCH for use by other mobile stations, thus, decreasing the number of collisions and increasing the overall efficiency of the system.

In block 154, the mobile station transmits a message portion 214 of the access probe on the assigned reverse reserved access channel R-RACH$_{13}$ 1 204 and receives power control commands 216 on the associated F-PCCH_1 206 as explained more fully below. The message portion can comprise a response to a page, an original request for a traffic channel, a datagram bearing user information in a digital data system, or other type of message. In block 156, the mobile station has completed the access attempt and the access routine enters an idle state.

Returning again to block 126, if the D1 timer expires before a matching hash ID is detected in a correctly received response message, flow continues to block 128. In block 128, the probe count is incremented. Block 130 determines whether the probe count is less than a threshold. If so, the maximum number of access probes have not been sent and flow continues to block 144 in which mobile station generates a random number PN(p) for the back-off period. In block 142, the flow waits the prescribed number of time slots designated by PN(b). In block 140, the mobile station increases its transmit power and flow continues back to block 118 where the access probe is transmitted at the higher power level over the R-CCCH(c).

If it is determined in block 130 that the maximum number of access probes have already been sent over the previously chosen R-CCCH, flow continues from block 130 to block 132. In block 132, the sequence number is incremented. Block 134 determines whether the sequence number is less than a prescribe threshold. If so flow continues through off page connector 138 back to FIG. 2A where, after a random delay, the mobile station randomly selects a new F-CACH and R-CCCH pair over which to attempt access to the system. If it is determined in block 134 that the sequence number is greater than or equal to the maximum sequence number, flow continues from block 134 to block 136 in which access failure is declared and the mobile station enters a system determination state.

The operation just described has a number of advantages in relation to the access scheme defined in IS-95. The request portion of the access probe is transmitted over a slotted aloha channel in a similar manner as the access probe in IS-95. However, according to IS-95, the mobile station transmits an entire access probe comprising a lengthy ESN and message which may have a duration as long as 520 msec. According to IS-95, the mobile station then monitors a paging channel for as much as 1360 msec for a traffic channel assignment message from the base station. If the traffic channel assignment message is not received, the mobile station sends the entire access probe again after insertion of a back-off period which can be as long as 8320 msec. Thus, in the event of a failure, as much as 9680 msec passes before the mobile station retransmits the entire access probe, typically at a higher power level than before, spewing even more energy into the system.

Thus, according to IS-95, typically 150 msec or more of energy is transmitted over the reverse link access channel whether or not the base station can detect the signal. In this way, significant energy is expend on futile access attempts lowering the efficiency of the mobile station power consumption and creating useless interference to the system. In addition, this type of operation introduces a significant delay in the event of an initial failure. The invention overcomes these limitations.

Under IS-95, the base station does not establish a forward link connection to the mobile station until the entire access probe has been received. Therefore, the base station has no way of transferring power control information to the mobile station during the transmission of the lengthy access probe. Without any power control, both the likelihood of excessive power generation (due to a transmission power level which is too high) and the likelihood of repeat transmission (due to a transmission power level which is too low) are increased, thus, increasing the level of interference to the system. In one embodiment, the invention also overcomes this limitation by providing closed loop power control for the message portion of the access probe.

According to well known, acquisition techniques, detection of the mobile station signal by the base station requires only a very small fraction of energy transmitted in the prior art access probe. Therefore, in contrast, the present invention uses of the request portion of the access probe in order to facilitate detection of the mobile station signal by the base station. The request portion of the access probe is significantly shorter than the access probe in IS-95. For example, in one embodiment, the entire request portion can be transmitted in 2.5 msec. Typically, the ratio of the duration of the request portion to the duration of the message portion is very small such as on the order of 0.01.

After transmission of the brief request portion, the mobile station ceases to transmit. If the base station receives the request, it responds with the brief channel assignment message. Again, the message may be relatively short as it specifies the hash ID rather than the entire ESN. For example, in one embodiment, the reserved access channel assignment message is 3.75 msec in length. In this way, transmission of the reserved access channel assignment message does not consume significant system resources. And, in this way, the mobile station is informed rather quickly as to whether the base station was able to detect its signal. For example, in FIG. 3, if the response message 212 is a channel assignment message for the mobile station, the mobile station is aware that the base station detected its signal approximately 5 msec after the end of the transmission of the request portion. This entire transaction can take place in about $\frac{1}{20}$ of the time necessary to just transmit an access probe according to IS-95.

Due to the short duration of the request portion of the access probe, the slot boundaries upon which the mobile station is permitted to begin transmission according to slotted aloha operation can follow closely one after another. In this way, the number of possible transmission times is increased which reduces the probability of collision and allows for more mobile stations to be supported by the random access channel. For example, according to IS-95, the slot boundaries occur at a rate of 1.92 to 12.5 boundaries per second. In one embodiment, the slot boundaries of the invention occur at a rate on the order of 800 boundaries per second. If two mobile stations transmit during the same slot boundary but the base station is able to detect one or both of the requests due to diversity such as time diversity due to path delays, the base station may assign each contending mobile station to a different R-RACH by reference to the hash ID, thus allowing the system to capture contending mobile stations in some situations.

If a failure does occur, the mobile station is aware of the failure within the period D1 which is, in one embodiment, on the order of 40 to 60 msec. The mobile station can send a follow up request portion on one of the rapidly occurring slot boundaries which follows, thus reducing the delay introduced by a failure. In addition, due to the brevity of the request portion, the amount of energy spewed uselessly into the system is greatly reduced in comparison with IS-95.

Once the mobile station is assigned a reserved access channel, the traffic channel assignment process can proceed in much the same manner as IS-95. In addition to the message portion which specifies the resources requested by the mobile station, the mobile station also transmits a short preamble in the message portion of the access probe so that the base station can detect the signal and perform coherent demodulation. In one embodiment, the preamble in the message portion is about 1.25 msec long.

One significant advantage of the use of the reserved multiple access scheme is that a forward link connection from the base station to the mobile station is readily established in parallel with the reverse link reserved multiple access channel. In contrast, according to operation under IS-95, the base station does not fully detect the mobile station until the entire access probe has been received and the mobile station does not begin to monitor for forward link signals until the entire access probe has been transmitted. However, in accordance with the invention, the base station is aware of the mobile station after transmission of the request portion. The assignment of the R-RACH allows a parallel forward link connection to the mobile station to be readily established. The base station can monitor the R-RACH assigned to the mobile station in order to quickly detect any transmission made by the mobile station.

As noted above, in one embodiment, the system uses a parallel forward link channel to implement closed loop power control of the mobile station transmission power during transmission of the message portion of the access probe. Closed loop power control refers to control of the mobile station transmission power by the base station. The base station determines the proper transmission level based upon the actual operating conditions at the base station. As shown in FIG. 3, in one embodiment, a single F-PCCH is associated with a plurality of R-RACH's. The power control commands for multiple mobile stations are time multiplexed onto the channel in a predetermined manner such that when a mobile station is assigned to a R-RACH, it can determine which information on the F-PCCH corresponds to its own transmission. In an alternative embodiment, the power control packets can be interleaved with data on a separate channel such as in a similar manner to the traffic channel operation according to IS-95. In one embodiment, the power control rate is a programmable. For example, power control commands may be passed to the mobile station at 0, 200, 400 or 800 commands/second. The power control rate may depend on the length of the message as well as other factors such as system loading. A rate of 0 commands/second may be used if the message is so short that the power control won't take effect until after the message has ended.

Figure 4:
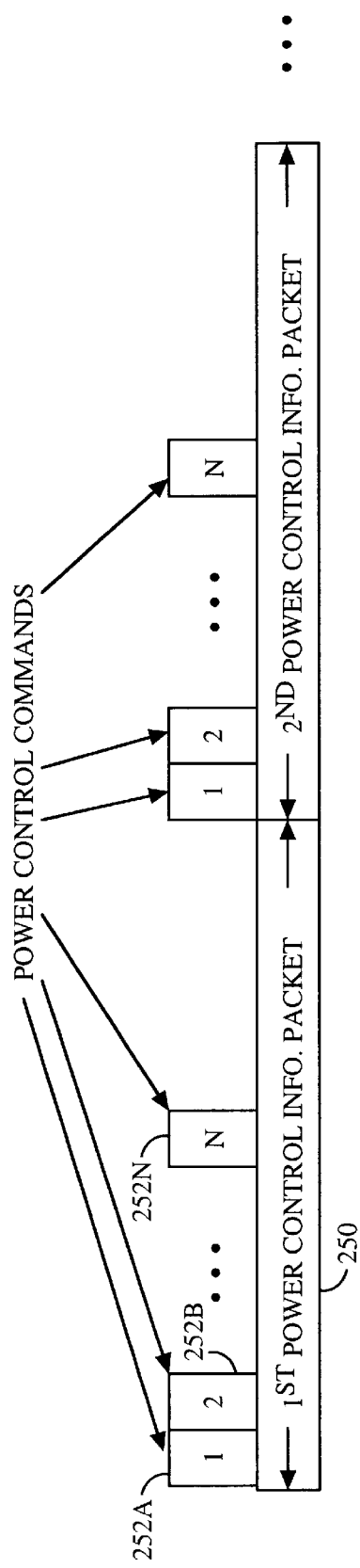
FIG. 4 is a representational diagram showing an exemplifying data structure for the forward power control common channel.

Referring now to FIG. 4, an exemplifying structure of a stream of power control information packets 250 is shown. Each power control information packet 250 is capable of carrying N power control commands 252A–252N. In this way, N different R-RACH can be associated with a single F-PCCH. In the embodiment shown in FIG. 4, each power control command 252 in the power control information packet 250 maps to a single R-RACH and is used to control the output power of the mobile station communicating over that R-RACH. Thus, the power control command 252A controls the output power level of the mobile station transmitting on $R\text{-}RACH_{13}$ 1, the power control command 252B controls the output power of the mobile station transmitting on R-RACH_2, and so on. As noted above, in one embodiment, the system allows for variable rate power control, such that some of the power control information packets 250 can comprise more than one command intended for a single mobile station or the F-PCCH can control more than N R-RACH by time multiplexing power control commands in successive power control information packets. In such a case, the mapping of the power control information packets to the associated R-RACH becomes less uniform but operates under the same principles.

In one embodiment, the power control commands are a single bit in length and the mobile station either raises or lowers its transmit power in accordance with the single bit value in a similar manner as traffic channel in IS-95. When a mobile station begins to transmit on a particular R-RACH, the mobile station begins to monitor the power control bit stream 250 and, in particular, to the power control command 252 that is mapped to the particular R-RACH.

Figure 5:
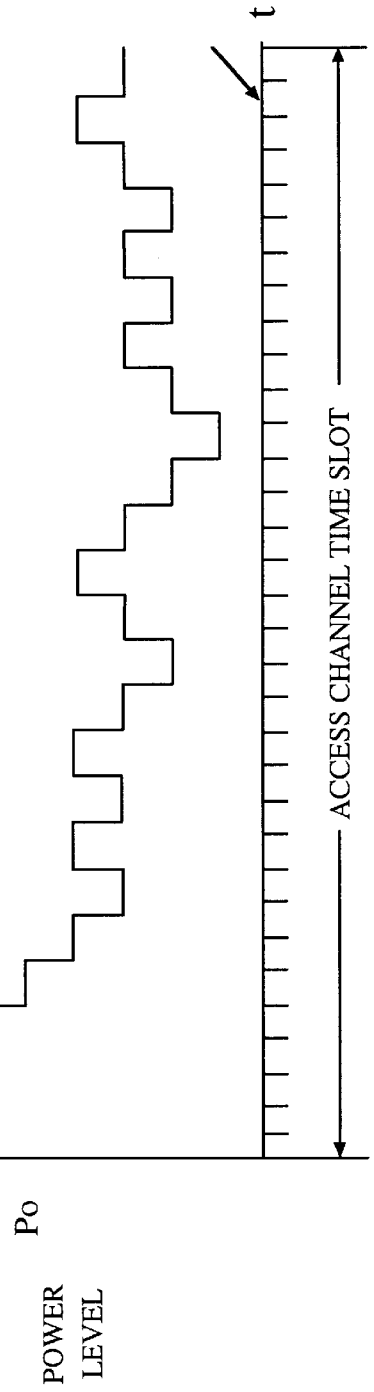
FIG. 5 is graph illustrating mobile station transmission power in a closed loop system.

Referring now to FIG. 5, there is shown a timing diagram illustrating the power transmitted by a mobile station on a R-RACH according to the power control information commands received over the F-PCCH. At the beginning of the access channel time slot, the mobile station transmits a preamble portion of the message portion of the access probe at an initial power level. Typically, the base station must acquire the mobile station signal and accumulate a series of signal quality indications before it begins to send power control bits to the mobile station. This delay is shown on both FIGS. 3 and 5 as D3. The remainder of FIG. 5 shows an exemplifying sequence of mobile station output powers in response to a series of power control commands received from the base station.

In one embodiment, the power control on the R-RACH is similar to the power control on the traffic channel as described IS-95. More specifically, the base station can compare the power level of the received signal to a threshold. If the received signal is below the threshold, the base station uses the power control information packet to send a single bit power-up command to the mobile station. Otherwise, the base station uses the power control information packet to send a single bit power-down command to the mobile station. In one embodiment, each of the power control bits is modulated with BPSK modulation and can, therefore, assume one of three states, namely off, 0 degrees and 180 degrees. More information concerning power control can be found in IS-95 and in U.S. Pat. Nos. 5,056,109 and 5,265,119, both of which are entitled METHOD AND APPARATUS FOR CONTROLLING TRANSMISSION POWER IN A CDMA CELLULAR TELEPHONE SYSTEM and assigned to the assignee of the present invention and incorporated by reference herein in their entirety.

Such closed loop power control is important for maximizing capacity of a mobile radio telephone system according to well known communications theories. Closed loop power control permits a mobile station which begins a R-RACH access by transmitting its signal with more power than is needed to be rapidly corrected to the desired power level once the base station has acquired the mobile station's transmission, thus reducing un-necessary interference in the system. Closed loop power control permits a mobile station which begins a R-RACH access by transmitting its signal with less power than is needed to be rapidly corrected to the desired power level once the base station has acquired the mobile station's transmission, thus reducing the probability of failure.

The separation of the message portion as well as the provision for power control during transmission of the message portion also lends flexibility to the system. For example, in a wireless data system, the mobile station is likely to generate short bursts of data interspersed between significantly longer periods of idleness. Rather than establishing a traffic channel each time that the mobile station has a burst of data, it may be advantageous to use the access process just described to bear user data. For example, the message portion of the access probe may contain a datagram of bearer traffic.

The invention lends itself particularly well to transmission of datagrams for several reasons. According to IS-95A, only a single data rate, 4800 bits/sec, is available for transmission of the access probe. According to the invention, the system can support a variety of data rates during access mode. In general, increased data rates are allowed if the mobile station can increase its transmission power so that the energy devoted to each bit ($E_b$) remains fairly constant even if the duration of each bit is reduced. For example, in one embodiment, the mobile station can increase its data rate to 9600 bit/sec, 19.2 kilobits/sec or 38.4 kilobits/sec if sufficient transmission power is available. The use of higher data rates allows the mobile station to transfer messages faster than at the lower data rates so that they consume the channel for less time and reduce congestion in the system. The use of higher data rates also decreases the time delay associated with the transfer of large datagrams. The use of higher data rates is practical because the closed loop power control which operates on the R-RACH allows the mobile station to increase its transmit power only to the extent it is necessary.

In addition, the use of a reserved channel allows load control of the system. Load control is more intelligent than simple persistence because it takes into account the data rate of the incoming signal. If a reserved channel carries data at an increased rate, it also consumes a more significant portion of system capacity. In one embodiment, the mobile station includes an indication of desired data rate in the preamble of the request portion. In another embodiment, the mobile station can include an indication of desired data rate in the preamble of the message portion. In yet another embodiment, the base station determines the data rate by reference to the implicit features of the mobile station signals. The base station uses the data rate to determine current system loading. If system loading reaches a predetermined threshold, the base station can, for example, begin to send wait messages to specific or all requesting mobile stations or can direct specific or all mobile stations to use a specified data rate.

Figure 6:
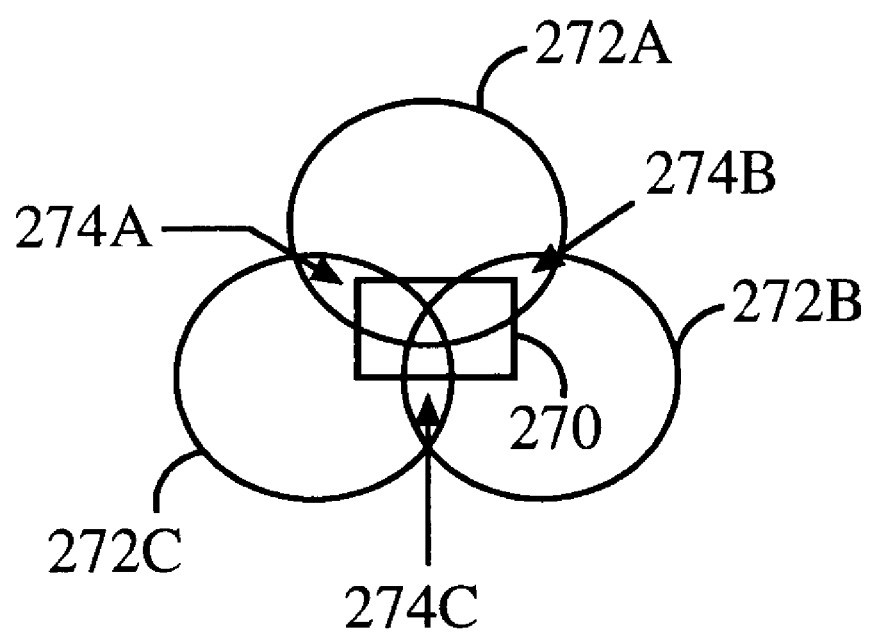
FIG. 6 is a representational diagram showing the coverage area sectors of a multisectored base station.

In one embodiment of the invention, the system incorporates pseudo softer handoff operation on the forward link, on the reverse link or both. FIG. 6 is a representational diagram showing the coverage area sectors of a multisectored base station. A multisectored base station 270 transmits signals into three different sector coverage areas 272A–272C. The sector coverage areas 272A–272C overlap to some extent in coverage overlap areas 274A–274C to provide a continuous coverage area associated with the base station. Within the coverage overlap areas 274A–274C, the system signal levels are sufficient for the mobile station to establish bi-directional communication with the base station through the two intersecting sectors. Such operation is detailed in U.S. Pat. No. 5,625,876, entitled METHOD AND APPARATUS FOR PERFORMING HANDOFF BETWEEN SECTORS OF A COMMON BASE STATION, assigned to the assignee hereof and incorporated herein in its entirety by this reference.

Figure 7:
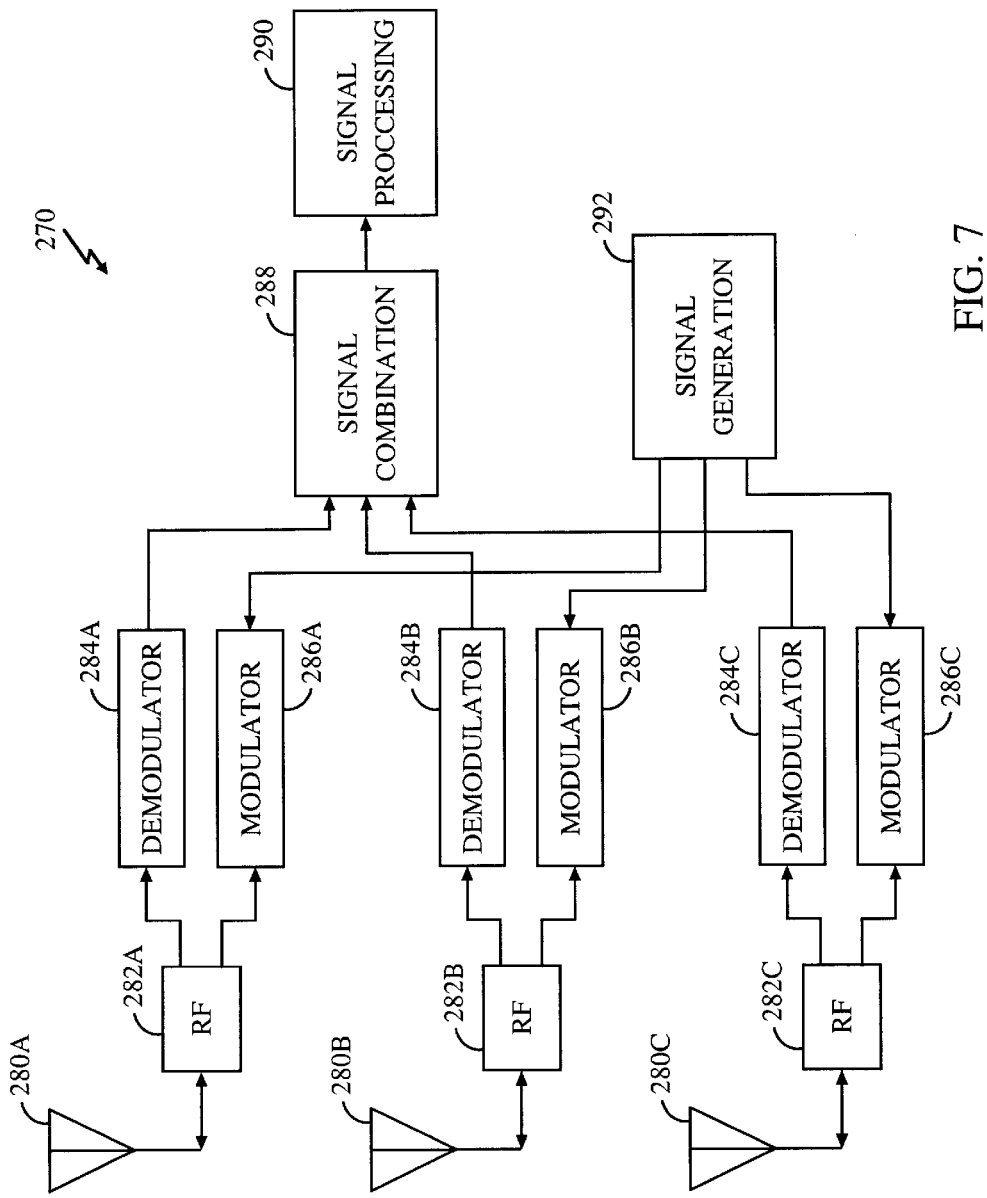
FIG. 7 is a block diagram of the multisectored base station.

FIG. 7 is a block diagram of the multisectored base station 270. Antennas 280A–280C receive signals from sector coverage areas 272A–272C, respectively. In one embodiment, one or more of the antennas 280A–280C are diversity antennas comprising two or more separate antenna elements. The antennas 280A–280C provide received energy to radio frequency (RF) processing blocks 282A–282C, respectively. The RF processing blocks 282A–282C down-convert and quantize the received signal energy to produce digital samples using any one of a myriad of well known techniques.

Demodulators 284A–284C receive the digital samples and demodulate one or more reverse link signals contained therein. In one embodiment, the demodulators 284A–284C comprise a set of demodulator elements and searcher elements such as those disclosed in U.S. Pat. No. 5,654,979, entitled CELL SITE DEMODULATION ARCHITECTURE FOR A SPREAD SPECTRUM MULTIPLE ACCESS COMMUNICATION SYSTEMS, assigned to the assignee hereof and incorporated herein in its entirety by this reference. According to the '979 patent, each demodulator comprises a set of demodulation elements, each of which can be assigned to a multipath propagation of one of the reverse link signals. The outputs of the demodulation elements are combined to create a resultant signal.

If a mobile station is in softer handoff, two or more of the demodulators 284 are assigned to demodulate the same reverse link traffic channel signal from the mobile station. The demodulators 284 output demodulated signals to a signal combination block 288 which can further merge traffic channel signals received through more than one sector. The output of the signal combination block 288 is coupled to a signal processing unit 290 which performs further signal processing on the merged output.

A signal generation block 292 creates the forward link signals. The signal generation unit 292 provides forward link signals to one or more of the modulators 286A–286C depending on the location of the mobile station. Only those sectors with established bi-directional communication transmit a traffic channel to the mobile station, thus reducing interference in those sectors which do not service the mobile station. The modulators 286A–286C modulate the signals for wireless link transmission and pass them to the RF processing blocks 282A–282C, respectively. The RF processing blocks 282A–282C convert the digital bits to analog signals and up-convert them to the desired transmission frequency. The antennas 280A–280C radiate the signals into the corresponding coverage areas sectors 272A–272C.

According to the prior art, the softer handoff techniques are associated only with the traffic channel where sustained bi-directional communication is established between the base station and the mobile station. According to IS-95, the access probes are only received by a single sector of a multisectored base station regardless of whether the mobile station is located in a coverage overlap area. Likewise, according to IS-95, the channel assignment message is transmitted from only one sector of a multisectored base station regardless of whether the mobile station is located in a coverage overlap area.

In general, each R-CCCH is associated with just one sector and a request portion of an access probe is detected by only one sector. In one embodiment of the invention, the base station 270 is configured to broadcast the F-CACH in all sectors of the base station in a so-called simulcast mode. In this way, a mobile station located within a coverage overlap area transmits the request message 210 to one sector but can receive the response message 212 from more than one sector, thus, increasing the combined signal energy detected by the mobile station and increase the probability of successful reception by the mobile station. This type of pseudo softer hand off operation during the access process mimics softer handoff on the forward link traffic channel. Thus, in FIG. 7, the signal generation block 292 creates the F-CACH and passes it to each of the modulators 286A–286C regardless of the origin of the request portion for which the response messages are generated. These same principles can be applied to transmission of the F-PCCH from multiple sectors. In another embodiment, the reliability of the reception of the F-CACH and F-PCCH by the mobile station is improved within a sector by using transmit diversity. In this embodiment, replicas of the same information are transmitted on different antenna elements within a given sector, using one or more diversity techniques such as orthogonal code diversity, time division repeated transmission, and delay transmissions.

In a similar manner, this principle can be extended to other base stations operating in the same area. Thus, when a mobile station sends a request portion of an access probe, a set of base stations in a zone surrounding the detecting base station respond with transmission of the response message. These same principles can be applied to transmission of the F-PCCH from multiple base stations. This type of pseudo soft hand off operation during the access process mimics soft handoff on the forward link traffic channel.

As noted above, according to IS-95, the base station does not fully detect the mobile station signal until the entire, rather lengthy, access probe is received the base station. Thus, according to IS-95, the softer handoff techniques applied to the traffic channel cannot be applied to the access process because the sector to which the access probe is directed cannot identify the signal to the other sectors so that they may also detect the signal. In contrast, according to the invention, the majority of the access probe is transmitted over the easily identifiable R-RACH. Thus, in one embodiment, a plurality of sectors demodulate the R-RACH and provide corresponding signal energy outputs. For example, when the request portion 210 is received over a R-CCCH associated with coverage area sector 272A, each of the demodulators 284–284C attempt to demodulate the R-RACH assigned to the mobile station. In this way, if the mobile station is located within one of the coverage overlap areas 274A–274C, the message portion of the access probe is received by each of the corresponding sector's demodulators 284. The resultant signals are merged by the signal communication block 288 and a single power control indication based upon the combined signal is generated. As noted above, the power control indication can be transmitted from more than one sector over a simulcast F-PCCH. This type of pseudo softer hand off operation during the access process mimics softer handoff on the reverse link traffic channel.

In a similar manner, this principle can be extended to other base stations operating in the same area. Thus, when a mobile station sends a request portion of an access probe, a set of base stations in a zone surrounding the detecting base station attempt to demodulate the R-RACH. This type of pseudo soft hand off operation during the access process mimics soft handoff on the reverse link traffic channel.

Incorporation of pseudo softer handoff, pseudo soft handoff or both on the reverse link greatly facilitates the proper operation of the power control on the R-RACH. Unless each base station and sector which is capable of receiving the mobile station signal at a significant level is able to contribute to the power control commands sent to the mobile station, the mobile station signal strength can become excessive at the non-contributing base stations and jam communications therethrough. Therefore, in one embodiment, each surrounding base station and sector attempts to demodulate the signal from the mobile station on the R-RACH and contributes to the power control command sent to the mobile station.

Figure 8:
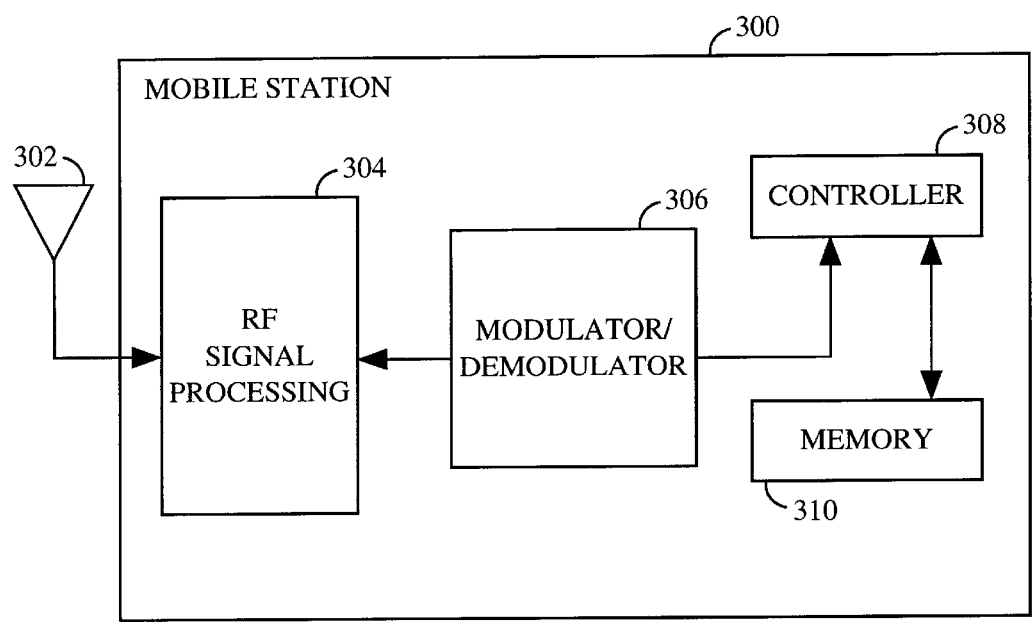
FIG. 8 is a block diagram of an exemplifying mobile station architecture.

FIG. 8 is a block diagram of an exemplifying mobile station architecture. An antenna 302 receives and transmits signals over a wireless link to a base station. An RF signal processing block 304 is coupled to the antenna 302. The RF signal processing block 304 down-converts and quantizes the received signal energy to produce digital samples using any one of a myriad of well known techniques. The RF signal processing block 304 is coupled to a modulator/demodulator (modem) 306. The modem 306 receives the quantized energy and demodulates the incoming signal under the control of a control 308. In one embodiment, the modem 306 operates in accordance with U.S. Pat. No. 5,764,687, MOBILE DEMODULATOR ARCHITECTURE FOR A SPREAD SPECTRUM MULTIPLE ACCESS COMMUNICATION SYSTEM, which is assigned to the assignee hereof and incorporated herein in its entirety by this reference. The modem 306 also modulates signals for transmission over the wireless link under the control of the controller 308. The modulated signals are coupled to the RF signal processing block 304 which converts the digital bits to analog signals and up-converts them to the desired transmission frequency for transmission over the antenna 302. In one embodiment, the blocks shown in FIGS. 2A and 2B are carried out by a series of processing units stored in a memory 310 and executed by the controller 308. In one embodiment, the mobile station comprises an application specific integrated (ASIC) circuit for execution of the functions. In another embodiment, the process blocks are stored in a programmable storage device.

Although the invention has been described in the context of a CDMA system where some of the CDMA channels are further channelized using time division techniques, other channelization techniques can benefit from the general principles described herein. For example, time division multiple access (TDMA) and frequency division multiple access (FDMA) channels could be used in accordance with the principles of the invention. In addition, the messages on the channels can be coded and interleaved. The messages can be repeated and the energies combined to improve reliability. Quadrature techniques can be used to increase the rate at which data is carried over the channels.

Other alternative embodiments will be readily apparent to one skilled in the art upon examination of the principles discussed herein including the simple re-arrangement of the blocks shown in FIGS. 2A and 2B. For example, the advantages gained by reducing the size of the mobile station identification transmitted in the request portion may be gained by reduction in size in other manners aside from the use of a hash function. In one embodiment, the mobile station may randomly choose a quasi-unique identification as a temporary identifier of the mobile station. In one alternative embodiment, once the mobile station sends the request portion of the access probe, it monitors the pilot signal strength as well as the F-CACH. If the pilot signal strength is relatively high but the F-CACH does not carry a response message, the mobile station determines that the base station did not detect the request portion because the signal level was too low. Therefore, the mobile station, without inserting arbitrary delay, retransmits the request portion at a higher signal level.

In one embodiment, the base station periodically sends a broadcast access control message. The access control message is used by the mobile station to determine the loading conditions of the system. The access control message comprises a message type field containing a value which indicates that the message is an access control message intended for reception by all mobile stations. The access control message also comprises a persistence parameter field containing a value which is used by the mobile station to determine the back-off timer value. The access control message also comprises a minimum wait time field containing a value which indicates the minimum value to be used in the persistence test, for load/flow control. If the minimum wait time field is set to its maximum value, accesses are shut off. Other system configuration information and related parameters can be carried on a forward link common control channel such as the paging channel in IS-95.

In another embodiment, the mobile station transmits a pilot sub-channel along with the message portion of the access probe. The inclusion of the pilot sub-channel may be performed by any one of a myriad of well known techniques. The sub-channel can be used by the mobile station to provide power control information to the base station concerning the power level at which it is receiving the F-PCCH. That is, the mobile station uses a small fraction of the pilot channel to convey increase or decrease commands to the base station so that the power allocated to its F-PCCH sub-channel is adjusted to the minimum acceptable level in order to conserve system resources.

In yet another embodiment, if the mobile station has a short message to transfer, it sends a request message on the R-CCCH with the hash ID set to all O's (or some other pre-selected value) which indicates to the base station that additional data follows immediately and that no channel assignment is required. The data that follows is transferred, for example, within about 5 msec, and, therefore, is too short to realize any significant benefit from using closed loop power control. In such a case, it can be more efficient to communicate this information on the random access channel rather than wait for the assignment of a reserved access channel. The request message is not subject to power control because it is being transmitted on the R-CCCH.

In one embodiment, the channel assignment message has a 1 bit indication which is used to inform the accessing mobile station that the base station has received multiple request portion messages in the same access slot. In this way, a mobile station awaiting a response on the F-CACH more quickly determines whether it should resend the request portion at a higher power level or the same power level or continue to wait for an assignment message. This feature can be used to reduce transmission delay.

In another embodiment, the channel assignment message may contain a power control correction value which is used by the mobile station to adjust its transmit power prior to closed loop power control being enabled on the reserved channel. In this scheme, the base station determines the adjustment necessary to support reliable communications based on, for example, the requested or assigned data rate as well as the received energy detected over the request portion of the mobile station's transmission.

In still a further embodiment, a class wait message is used to effect the behavior of a class of mobile stations attempting to access the system. A class wait message indicates that those mobile stations which have a class mark less than or equal to a class mark threshold are forced to use a different set of persistence and back-off parameters or to cease attempting to access the system and revert back to monitoring the appropriate overhead channel to get updated access parameters. Those mobile stations which have a class mark greater than the class mark threshold are permitted to continue accessing the system, either using existing or updated persistence and back-off parameters. In this way, the system has a mechanism for quickly disabling accesses in a prioritized manner in order to control loading.

In yet another embodiment, mobile stations wishing to access the system can monitor the activity on the F-PCCH, F-CACH or both in order to derive an estimate of system loading. This estimate can be used to affect the parameters that affect the access behavior of the mobile station, such as persistence, back-off, data rate, and such. This scheme can be used effectively to increase the efficiency of the request channel in certain operating environments.

In one embodiment, the invention is embodied in a system which uses a set of binary code sequences as signatures. For example, the preamble sent by the mobile station to the base station to access the system is one of a set of predetermined, distinguishable code sequences called signatures. The mobile station selects one of the signatures to transmit each time it attempts to access the system. For example, the mobile station randomly selects one of 16 different 1 msec long signatures and transmits it during one of a series of 1.25 msec time slots. Or, the mobile station can generate a signature based upon the mobile station's uniquely identifying number.

The base station monitors the R-CCCH for each of the 16 signatures in all time slots. When the base station detects a signature, it responds to the mobile station on the F-CACH with a message which reflects the signature used by the mobile station. For example, in one embodiment, the base station responds to the mobile station on the F-CACH using a message modulated with the same binary code sequence used by the mobile station. In another embodiment, the base station responds with a message modulated by a different binary code sequence which is associated with the signature used by the mobile station in a predetermined fashion. In another embodiment, the base station responds on the F-CACH by including a field which designates the signature used by the mobile station. For example, if there are 16 signatures available, the base station can specify which signature of the access probe to which it is responding by a field with four bits. In this way, the overhead burden of a transmitting the hash function is eliminated on both the F-CACH and the R-CCCH, thus decreasing the amount of system resources expended on these tasks.

In one embodiment, each signature comprises a 256 bit sequence which is repeated 16 times and which is modulated according to 16 bit mask. On the reverse link, the sequence can be a segment of a Gold code such as those describe on pages 833 and 834 of John Proakis, *Digital Communications, Second Edition*, McGraw-Hill Book Company (1989). On the forward link, the sequence can be an orthogonal variable spreading factor (OVSF) code or variable length or hierachical Walsh code of length 256 as are well known in the art. In this way, the forward link transmission on the F-CACH are orthogonal to the other forward link transmissions.

In one embodiment, one or more of the binary code sequences used by the base station on the F-CACH are reserved to indicate a level of loading at the base station. For example, one of the binary code sequences can indicate that a maximum loading has been exceed, thus indicating to the mobile station to wait until the load indicator is turned off, to enter a back-off procedure according to persistence parameters or both. In this embodiment, after transmitting a signature over the R-CCCH, the mobile station monitors the F-CACH in order to detect the responsive message corresponding to the transmitted signature as well as one or more of the signatures which indicate the level of loading.

In one embodiment, the polarity of the binary code sequence transmitted by the base station on the F-CACH conveys information to the mobile station. For example, the polarity of the code sequence can be used to convey power control information to the mobile station. One polarity can indicate to the mobile station to increase the level at which it transmits on the R-RACH above the level used on the R-CCCH and the inverse polarity can indicate to the mobile station to decrease the level at which it transmits on the R-RACH below the level used on the R-CCCH. The polarity could also be used to set or limit the data rate at which the mobile station transmits on the R-RACH.

The use of signatures can be characterized as the use of a limited number of semi-unique ID's (such as the hash ID's) used to modulate the signal. In one embodiment, a randomly chosen signature is modulated according to a hash ID associated with the mobile station. In another embodiment, the hash ID is carried as data in a message modulated with the signature. When the base station responds on the F-CACH, the response message can indicate the hash ID. The use of a hash ID reduces the probability of false capture if two mobile stations use the same signature at the same time but the base station detects only one. If the mobile station whose signal was not detected decodes the message on the R-RACH comprising the hash ID of the other mobile station, it can thus determine that the R-RACH transmission is intended for another mobile station.

In one embodiment, the hash ID is transferred implicitly over the F-CACH. For example, the binary code sequence used to modulate the channel assignment message is a unique function of the hash ID. Thus, the hash ID is not sent explicitly along with the other data intended for the mobile, but instead is used to select or modify the code used on the F-CACH. The mobile station demodulates the F-CACH using the code sequence derived based on its own hash ID and, if it successfully decodes the acknowledgement, can proceed to transmit the remainder of the message on the assigned R-RACH channel. In one embodiment, a separate forward link channel which is orthogonal to all other forward link channels is used to convey the hash ID and other data. In another embodiment, the hash ID is used to modify the existing sequence used on the forward link channel used to convey the hash ID and other data. In this way, the binary code sequence used on the F-CACH can be function of the signature, the hash ID or both.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. In a communication system, a method of accessing a base station from a mobile station, comprising:

selecting a first signature sequence from a plurality of signature sequences used by multiple mobile stations;

transmitting a request portion of an access probe over a reverse link common control channel subject to contention, said access probe modulated with said signature sequence;

receiving a channel assignment message from said base station designating a reserved access channel, said reserved access channel providing communication with a low probability of contention and said channel assignment message reflecting said first signature;

transmitting a message portion of said access probe over said reserved access channel, wherein said transmitting said message portion facilitates reception of said message portion by a plurality of base stations;

receiving a power control command over a forward link channel associated with said reserved access channel; and responding to said power control command by increasing or decreasing a power level at which said mobile station transmits said message portion.

2. The method of claim 1, wherein said message portion comprises an overhead message.

3. The method of claim 1, wherein said message portion comprises user data.

4. The method of claim 1, wherein said transmitting said message portion occurs at one of a plurality of available data rates.

5. In a communication system, a method of accessing a base station from a mobile station, comprising:

selecting a first signature sequence from a plurality of signature sequences used by multiple mobile stations;

transmitting a request portion of an access probe over a reverse link common control channel subject to contention, said access probe modulated with said signature sequence;

receiving a channel assignment message from said base station designating a reserved access channel, said reserved access channel providing communication with a low probability of contention and said channel assignment message reflecting said first signature;

transmitting a message portion of said access probe over said reserved access channel, wherein said message portion comprises a call origination message;

receiving a power control command over a forward link channel associated with said reserved access channel; and responding to said power control command by increasing or decreasing a power level at which said mobile station transmits said message portion.

6. In a communication system, a method of accessing a base station from a mobile station, comprising:

selecting a first signature sequence from a plurality of signature sequences used by multiple mobile stations;

transmitting a request portion of an access probe over a reverse link common control channel subject to contention, said access probe modulated with said signature sequence;

receiving a channel assignment message from said base station designating a reserved access channel, said reserved access channel providing communication with a low probability of contention and said channel assignment message reflecting said first signature;

transmitting a message portion of said access probe over said reserved access channel, wherein said message portion is longer than said request portion;

receiving a power control command over a forward link channel associated with said reserved access channel; and responding to said power control command by increasing or decreasing a power level at which said mobile station transmits said message portion.

7. The method of claim 1, wherein said request portion comprises an identification which quasi-uniquely identifies said mobile station.

8. The method of claim 7, further comprising determining said identification which quasi-uniquely identifies said mobile station from a unique identifying number associated with said mobile station using a hash function.

9. The method of claim 7, further comprising randomly selecting said identification which quasi-uniquely identifies said mobile station.

10. In a communication system, a method of accessing a base station from a mobile station, comprising:

selecting a first signature sequence from a plurality of signature sequences used by multiple mobile stations;

transmitting a request portion of an access probe over a reverse link common control channel subject to contention, said access probe modulated with said signature sequence;

receiving a channel assignment message from said base station designating a reserved access channel, said reserved access channel providing communication with a low probability of contention and said channel assignment message reflecting said first signature and specifying a wait period to be observed;

transmitting a message portion of said access probe over said reserved access channel;

receiving a power control command over a forward link channel associated with said reserved access channel;

responding to said power control command by increasing or decreasing a power level at which said mobile station transmits said message portion; and delaying said transmitting said message portion with reference to said wait period.

11. In a communication system, a method of accessing a base station from a mobile station, comprising:

selecting a first signature sequence from a plurality of signature sequences used by multiple mobile stations;

transmitting a request portion of an access probe over a reverse link common control channel subject to contention, said access probe modulated with said signature sequence;

receiving a channel assignment message from said base station designating a reserved access channel, said reserved access channel providing communication with a low probability of contention and said channel assignment message reflecting said first signature and specifying a power control information;

transmitting a message portion of said access probe over said reserved access channel;

receiving a power control command over a forward link channel associated with said reserved access channel; and responding to said power control command by increasing or decreasing a power level at which said mobile station transmits said message portion; and determining a power level at which to transmit said message portion with reference to said power control information.

12. The method of claim 11, wherein said channel assignment message is spread with a second spreading sequence, said second spreading sequence reflecting said first signature.

13. The method of claim 12, wherein a polarity of said second spreading sequence conveys mobile station information.

14. The method of claim 13, wherein said mobile station information is power control information.

15. The method of claim 13, wherein said mobile station information is data rate information.

16. The method of claim 1, wherein said forward link channel is expressly specified in said channel assignment message.

17. In a communication system, a method of accessing a base station from a mobile station, comprising:

selecting a first signature sequence from a plurality of signature sequences used by multiple mobile stations;

transmitting a request portion of an access probe over a reverse link common control channel subject to contention, said access probe modulated with said signature sequence;

receiving a channel assignment message from said base station designating a reserved access channel, said reserved access channel providing communication with a low probability of contention and said channel assignment message reflecting said first signature;

transmitting a message portion of said access probe over said reserved access channel;

receiving a power control command over a forward link channel associated with said reserved access channel; and responding to said power control command by increasing or decreasing a power level at which said mobile station transmits said message portion;

receiving a message from said base station modulated with a predetermined sequence, said predetermined sequence reflecting a level of loading at said base station.

18. A mobile communication station, comprising:

a controller configured to generate a first signature sequence from a plurality of signature sequences used by multiple mobile stations;

a modulator coupled to said controller, said modulator being configured to modulate a request portion of an access probe with said first signature sequence and to modulate a message portion of said access probe;

a radio frequency signal processing unit coupled to said modulator, said signal processing unit being configured to transmit said request portion over a forward link common control channel subject to contention and configured to receive a channel assignment message reflecting said first signature and a reserved access channel, said reserved access channel providing communication with a low probability of contention and configured to transmit said modulated message portion over said reserved access channel, said radio frequency signal processing unit comprising:

a power control apparatus configured to receive a power control command over a forward link channel and configured to respond thereto by increasing or decreasing a power level at which said mobile station transmits said message portion; and a demodulator coupled to said radio frequency signal processing unit and said controller, said demodulator configured to demodulate said channel assignment message according to a second signature sequence associated with said first signature sequence.

19. A mobile communication station, comprising:

a controller configured to generate a first signature sequence from a plurality of signature sequences used by multiple mobile stations;

a modulator coupled to said controller, said modulator being configured to modulate a request portion of an access probe with said first signature sequence and to modulate a message portion of said access probe;

a radio frequency signal processing unit coupled to said modulator, said signal processing unit being configured to transmit said request portion over a forward link common control channel subject to contention and configured to receive a channel assignment message reflecting said first signature and a reserved access channel, said reserved access channel providing communication with a low probability of contention and configured to transmit said modulated message portion over said reserved access channel, said radio frequency signal processing unit comprising:

a power control apparatus configured to receive a power control command over a forward link channel and configured to respond thereto by increasing or decreasing a power level at which said mobile station transmits said message portion, wherein said radio frequency signal processing unit is further configured to receive said power control command from a plurality of sectors associated with a single base station; and a demodulator coupled to said radio frequency signal processing unit and said controller, said demodulator configured to demodulate said channel assignment message.

20. A method of communication system access, comprising:

receiving a request portion of an access probe modulated with a first signature sequence selected from among a plurality of signature sequences which provide communication subject to contention;

transmitting a channel assignment message designating said first signature sequence and a reserved access channel, said reserved access channel providing communication with a low probability of contention;

receiving a message portion of said access probe over said reserved access channel from a mobile station, wherein said channel assignment message specifies a wait period to be observed before said receiving said message portion is executed; and transmitting a power control command over a forward link channel based upon a signal quality level at which said message portion is received during said receiving said message portion.

21. The method of claim 20, wherein said step of receiving said message portion is performed by a plurality of sectors associated with a base station.

22. The method of claim 20, wherein said request portion comprises an identification which quasi-uniquely identifies said mobile station.

23. A method of communication system access, comprising:

receiving a request portion of an access probe modulated with a first signature sequence selected from among a plurality of signature sequences which provide communication subject to contention;

transmitting a channel assignment message designating said first signature sequence and a reserved access channel, said reserved access channel providing communication with a low probability of contention;

receiving a message portion of said access probe over said reserved access channel from a mobile station; and transmitting a power control command over a forward link channel based upon a signal quality level at which said message portion is received during said receiving said message portion;

determining a power correction amount based upon a signal quality level at which said request portion is received and wherein said channel assignment message specifies said power control correction amount to be used by said mobile station to transmit said message portion.

24. The method of claim 23, further comprising the step of transmitting a power control command through a plurality of sectors associated with said base station, said transmitting step being performed in response to a signal quality level at which said message portion is received.

25. A method of communication system access, comprising:

receiving a request portion of an access probe modulated with a first signature sequence selected from among a plurality of signature sequences which provide communication subject to contention;

transmitting a channel assignment message designating said first signature sequence and a reserved access channel, said reserved access channel providing communication with a low probability of contention, and wherein said transmitting said channel assignment message includes modulating said channel assignment message with a second signature sequence, said second signature sequence associated with said first signature sequence;

receiving a message portion of said access probe over said reserved access channel from a mobile station; and transmitting a power control command over a forward link channel based upon a signal quality level at which said message portion is received during said receiving said message portion.

26. A method of communication system access, comprising:

receiving a request portion of an access probe modulated with a first signature sequence selected from among a plurality of signature sequences which provide communication subject to contention;

transmitting a channel assignment message designating said first signature sequence and a reserved access channel, said reserved access channel providing communication with a low probability of contention;

receiving a message portion of said access probe over said reserved access channel from a mobile station;

transmitting a power control command over a forward link channel based upon a signal quality level at which said message portion is received during said receiving said message portion; and transmitting a loading message modulated with a spreading sequence which reflects a level of loading at a base station.

* * * * *